United States Patent [19]

Urata

[11] Patent Number: 4,647,979
[45] Date of Patent: Mar. 3, 1987

[54] AUTOMATIC FOCUSING DEVICE FOR VIDEO CAMERA

[75] Inventor: Shinji Urata, Tokyo, Japan

[73] Assignee: Asahi Kogaku Kogyo Kabushiki Kaisha, Tokyo, Japan

[21] Appl. No.: 683,445

[22] Filed: Dec. 19, 1984

[30] Foreign Application Priority Data

Dec. 20, 1983 [JP] Japan .................. 58-241136

[51] Int. Cl.$^4$ .............................. H04N 3/26
[52] U.S. Cl. .................... 358/227; 354/430
[58] Field of Search ............... 358/227; 354/430, 406, 354/407, 408; 352/140

[56] References Cited

U.S. PATENT DOCUMENTS

| | | | |
|---|---|---|---|
| 4,273,430 | 6/1981 | Fritsche | 354/430 |
| 4,382,665 | 5/1983 | Eguchi | 358/227 |
| 4,383,274 | 5/1983 | Inuiya | 358/227 |
| 4,531,158 | 7/1985 | Murakami | 358/227 |

*Primary Examiner*—Gene Z. Rubinson
*Assistant Examiner*—L. C. Schroeder
*Attorney, Agent, or Firm*—Sughrue, Mion, Zinn, Macpeak and Seas

[57] ABSTRACT

An automatic focusing device for a video camera in which undesirable defocusing caused by the presence of an unwanted object moving through the field of view between the photographing lens and the desired object is eliminated. The output of automatic focusing sensor, which may be a line sensor or area sensor, is alternately stored in two memories. The contents of the two memories are compared and discriminated to determine when an unwanted object has moved into the photographing field. This is effected by detecting the presence of a change beginning at one end of the sensor. When such is detected, the automatic focusing operation is inhibited for a predetermined period of time.

3 Claims, 5 Drawing Figures

AUTOMATIC FOCUSING DEVICE FOR VIDEO CAMERA

BACKGROUND OF THE INVENTION

The present invention relates to an automatic focusing device for a video camera.

Recently, video cameras have come into wide use, and there have been available many video cameras having automatic focusing devices. A video camera with an automatic focusing device has a significant merit in that it is unnecessary to manually focus the lens on the object. In general, a conventional automatic focusing device is designed so that as soon as the camera becomes out of focus the device operates to return the camera quickly to the focused state. However, the conventional automatic focusing device is disadvantageous in that, when, for instance, an unwanted object passes between the lens and the target object (which occurs frequently in ordinary photographing operations), the device operates to focus the lens on the unwanted object, whereupon the target object becomes out of focus. Thus, the resultant picture appears unsatisfactory on the television screen.

In order to eliminate this problem of focusing on the unwanted object (hereinafter referred to as "a crossing object"), an automatic focusing device has been proposed in which the lens driving operation is suspended for a period of time required for the crossing object to completely move out of the photographing field. Such a conventional automatic focusing device can effectively eliminate the defocusing problem caused by the crossing object. However, the device suffers from other drawbacks in that, when the camera is panned, the response of the device is slow, and when an object moves towards or away from the camera, the device cannot follow the object at all.

SUMMARY OF THE INVENTION

Accordingly, an object of the invention is to provide an automatic focusing device in which the above-described difficulties accompanying a conventional automatic focusing device have been eliminated.

In accordance with the above and other objects, the invention provides an automatic focusing device employing a CCD or MOS line sensor or area sensor as its automatic focus sensor. Based on the fact that, when the focused state becomes defocused due to the presence of a crossing object, the output waveform of the automatic focus sensor changes beginning with at least one of the two ends thereof while in other cases the output waveform changes uniformly as a whole, automatic focusing control is suspended for a predetermined period of time.

DESCRIPTION OF THE PREFERRED EMBODIMENTS

Figure 1A:
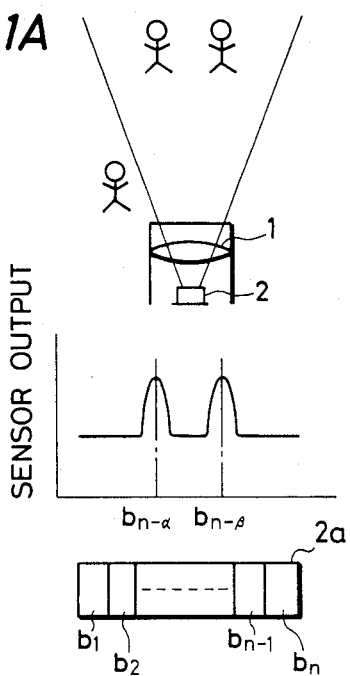
FIGS. 1A–1D are diagrams showing the outputs of automatic focus sensors for various conditions of objects to be photographed.

The invention will now be described with reference to the accompanying drawings.

FIGS. 1A to 1D show, respectively, outputs of an automatic focus sensor in the reference case where the lens is focused on target objects, in the case where there is a crossing object, in the case where the camera is panned, and in the case where the objects move toward the lens. In these figures, reference numeral 2 designates the automatic focus sensor. In this embodiment, the automatic focus sensor 2 is an n-bit line sensor as indicated at 2a.

Figure 1B:
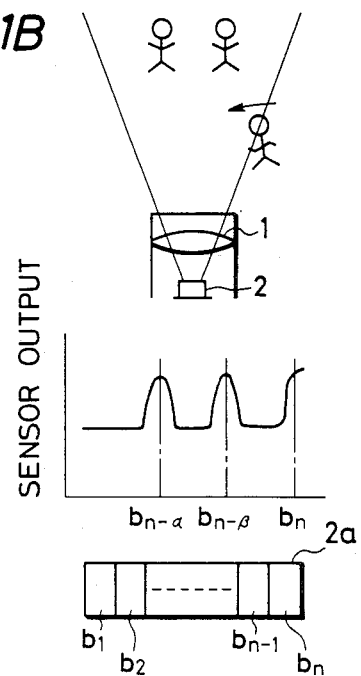
Figure 1C:
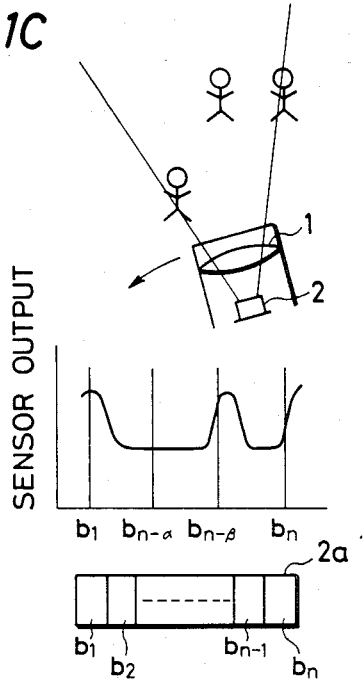
Figure 1D:
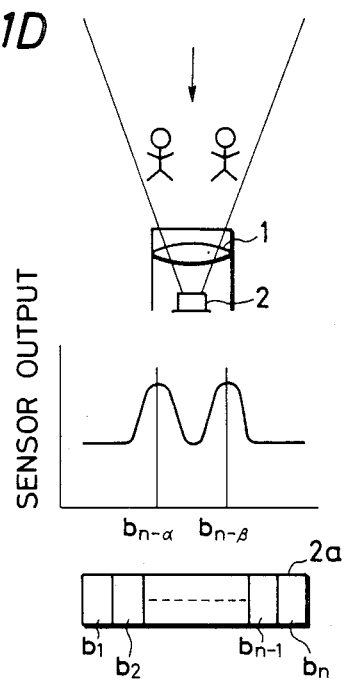

The output waveforms of the automatic focus sensor 2 shown in FIGS. 1C and 1D vary with respect to that of the automatic focus sensor shown in FIG. 1A, and in the case where the crossing object appears, as shown in FIG. 1B, the waveform portions around the bits $b_{n-\alpha}$ and $b_{n-\beta}$ are the same as those of FIG. 1A but the waveform portions near the bit $b_n$ are different from the corresponding portions in FIG. 1A. That is, among the various cases where the focused state is changed to the defocused state, only in the case where there is a crossing object does the output of the sensor not change with respect to the target object, and changes with respect to the crossing object begin from at least one of the two ends of the automatic focus sensor 2.

As is clear from the above description, the defocusing data in the case where there is a crossing object can be discriminated from those in the other cases where the camera is panned or the object moves towards or away from the lens by utilizing the output waveform of the automatic focus sensor. The employment of a discrimination output signal produced accordingly is employed in accordance with the invention to stop automatic focusing control for a predetermined period of time.

Figure 2:
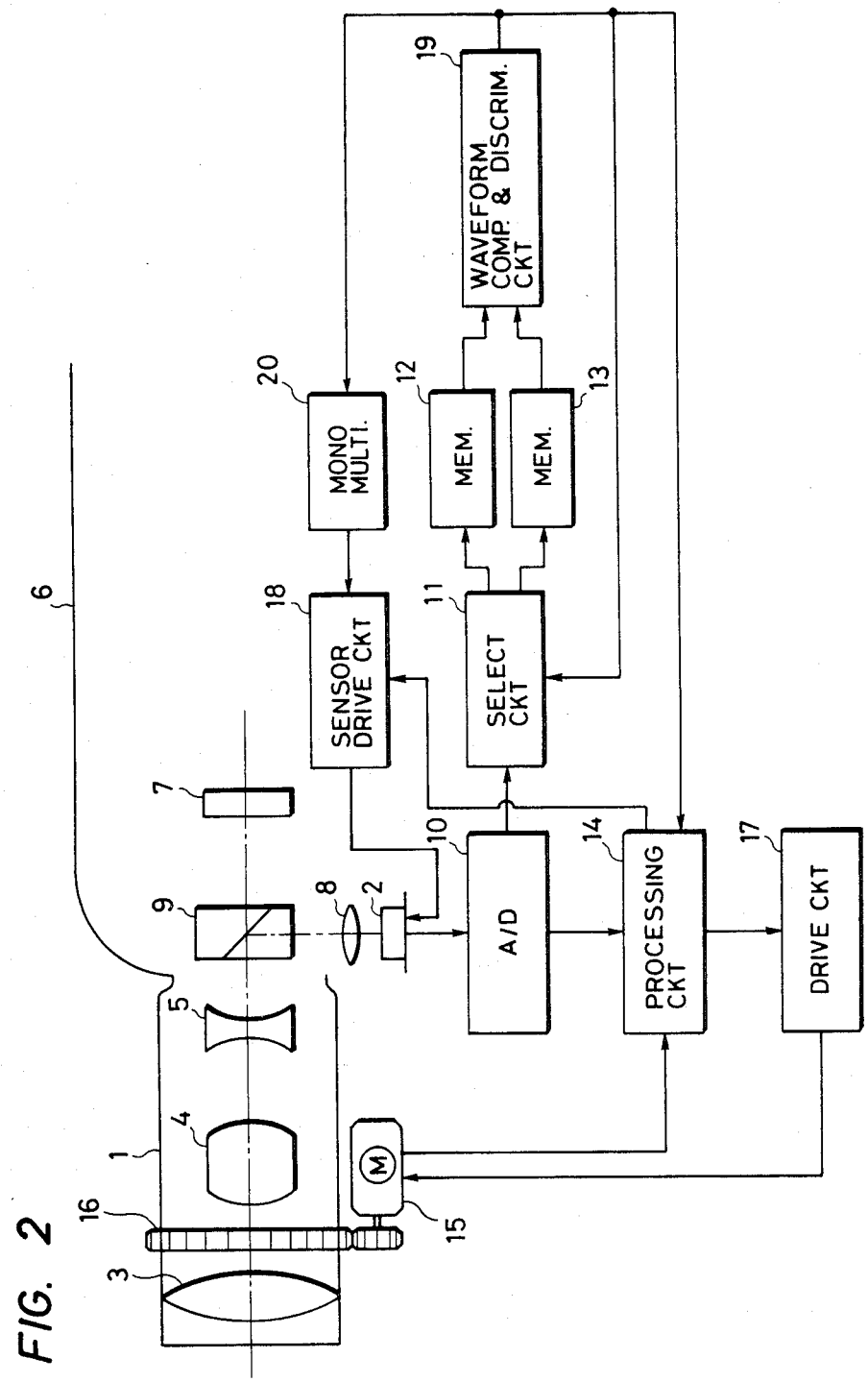
FIG. 2 is an explanatory diagram, partly as a block diagram, showing a preferred embodiment of an automatic focusing device of the invention.

FIG. 2 shows in block diagram form an automatic focusing device of the invention. As shown in FIG. 2, a photographing lens is composed of a focusing lens 3, a variator lens 4 and a compensator lens 5. A beam splitter 9 is disposed in a video camera 6 on which the photographing lens 1 is mounted. The beam splitter 9 splits the reflected light beam from the object into two beams; one beam is applied to an image pickup unit 7, and the other beam is applied through a relay lens 8 to an automatic focus sensor 2. The output of the automatic focus sensor 2 is connected to an A/D (analog-to-digital) converter 10, the output of which is connected through a select circuit 11 to memories 12 and 13 and is further connected to a processing circuit 14. The output of the processing circuit 14 is connected to a drive circuit 17 which moves the focusing lens 3 along the optical axis with the aid of a motor 15 and a focusing lens drive gear 16. The output of the processing circuit 14 is also applied to a sensor drive circuit 18 which controls the charge of the aforementioned automatic focus sensor 2. A signal from the motor 15 indicative of the speed of the motor 15 is applied to the processing circuit 14. Digital data stored in the memories 12 and 13 is subjected to comparison and discrimination in a waveform comparing and discriminating circuit 19, which outputs a reset signal only when the contents stored in the memories 12 and 13 have the relation of the signals shown in FIGS. 1A and 1B. The output of the circuit 19 is connected to a monostable multivibrator 20 used to stop for a certain period of time the operation of the sensor drive circuit 18, the select circuit 11 and the processing circuit 14.

The select circuit 11 applies digital data from the A/D converter 10 alternately to the memories 12 and 13 until it receives a clear signal from the waveform comparing and discriminating circuit 19. When the select circuit 11 receives the clear signal, it operates to continuously apply the nextly received digital data to the appropriate one of the memories 12 and 13. Each of the memories 12 and 13 is designed so as to be reset when new digital data is applied thereto and when the power switch of the video camera 6 is turned off.

The operation of the above-described embodiment of the invention will be described.

When the power switch of the video camera 6 is turned on, reflected light beam from an object which has passed through the photographing lens 1 and has been divided by the beam splitter 9 is applied through the relay lens 8 to the automatic focus sensor 2. As a result, the automatic focus sensor 2 outputs an analog signal as shown in FIG. 1A. The output of the automatic focus sensor 2 is converted into digital form by the A/D converter 10. The output of the A/D converter 10 is applied through the select circuit 11 to the memory 12 so as to be stored in the latter, and it is further applied to the processing circuit 14. The processing circuit 14 determines the amount and direction of focusing according to the digital signal applied thereto, and in response causes the drive circuit 17 to drive the motor 15 so that the focusing lens 3 is moved along the optical axis by the focusing gear 16 until the lens is focused on the aimed object. The focusing operation is ended when the number of revolutions of the motor 15 reaches a value corresponding to the result of calculation of the processing circuit 14.

Upon completion of the focusing operation, the processing circuit 14 applies a charge accumulating instruction to the sensor drive circuit 18, as a result of which the automatic focus sensor 2 again starts charge accumulation in response to a signal from the sensor drive circuit 18. The output of the automatic focus sensor 2 is converted into a digital value by the A/D converter 10. The digital value is applied through the select circuit 11 to the memory 13 so as to be stored therein, and it is further applied to the processing circuit 14.

It is now assumed that the digital signal stored in the memory 13 corresponds to the case of FIG. 1B in which an unwanted object moves across the photographing field. In this case, the waveform comparing and discriminating circuit 19, upon subjecting the contents of the memories 12 and 13 to comparison and discrimination, outputs a reset signal to thereby reset the processing circuit 14. Therefore, the defocusing phenomenon due to the crossing object is disregarded. Also, in response to the reset signal, the monostable multivibrator 20 is operated to stop the operation of the sensor drive circuit 18 for a certain period of time. Thus, the photographing lens is maintained focused on the target object until the crossing object has passed across the photographing field.

After this certain period of time has lapsed the automatic focus sensor 2 starts charge accumulation. The output of the automatic focus sensor 2 is applied through the A/D converter 10 to the select circuit 11 and the processing circuit 14. As the reset signal from the waveform comparing and discriminating circuit 19 has been applied to the select circuit 11, the digital signal from the A/D converter 10 is applied only to the memory 13 to be stored therein and the contents which have been stored in the memory 12 are retained. Thus, in the waveform comparing and discriminating circuit 19, the contents of the memories 12 and 13 are then subjected to comparison and discrimination to detect the crossing object.

If the content of the memory 13 is different from that shown in FIG. 1B, the waveform comparing and discriminating circuit 19 outputs no reset signal. Therefore, the processing circuit 14 determines any amount of defocusing and generates a direction signal according to the digital signal applied thereto to cause the drive circuit 17 to drive the motor 15 thereby to perform the focusing operation in the ordinary manner.

Upon completion of the focusing operation, the automatic focus sensor starts charge accumulation again. The above-described operation is repeatedly carried out as long as the power switch of the video camera 6 is on.

In the above-described embodiment, a line sensor is employed as the automatic focus sensor. However, the same effect can be obtained also by employing an area sensor.

As is apparent from the above description, the automatic focusing device of the invention is based on output waveform variations, and only when an unwanted output passes before the lens is the automatic focusing control suspended for a predetermined period of time. Therefore, the difficulties of the conventional automatic focusing device that the response of the device is slow when the camera is panned and the device cannot sufficiently follow an object which moves towards or away from the camera are eliminated according to the invention.

I claim:

1. An automatic focusing device for a video camera employing a line sensor or an area sensor as an automatic focusing sensor, comprising:
   selecting means receiving a digitized output of said automatic focus sensor;
   first and second memory means alternately receiving an output of said selecting means; and
   waveform comparing and discriminating means for comparing and discriminating waveforms of signals stored in said first and second memory means, an output of said comparing and discriminating means being applied to inhibit an automatic focusing operation of said automatic focusing device for a predetermined period of time when said signal stored in said first and second memory means have a predetermined relationship.

2. The automatic focusing device of claim 1, wherein said waveform comparing and discriminating means comprises means for detecting the presence of a difference between said signal stored in said first and second memory means beginning from a position corresponding to at least one end of said sensor.

3. The automatic focusing device of claim 1, wherein an output of said waveform comparing and discriminating means is applied as a control signal to said selecting means.

* * * * *